US008269434B2

(12) United States Patent
Welchko et al.

(10) Patent No.: US 8,269,434 B2
(45) Date of Patent: Sep. 18, 2012

(54) ELECTRICAL SYSTEM USING PHASE-SHIFTED CARRIER SIGNALS AND RELATED OPERATING METHODS

(75) Inventors: Brian A. Welchko, Torrance, CA (US); Jeremy B. Campbell, Torrance, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 413 days.

(21) Appl. No.: 12/473,933

(22) Filed: May 28, 2009

(65) Prior Publication Data

US 2010/0071970 A1    Mar. 25, 2010

Related U.S. Application Data

(63) Continuation-in-part of application No. 12/236,172, filed on Sep. 23, 2008.

(51) Int. Cl.
*H02P 1/00* (2006.01)

(52) U.S. Cl. ......... 318/139; 318/254; 318/727; 318/801

(58) Field of Classification Search .......... 318/139, 318/254, 727, 722, 801, 808; 310/195, 179, 310/180, 198
See application file for complete search history.

(56) References Cited

U.S. PATENT DOCUMENTS

| 5,142,468 A | 8/1992 | Nerem |
| 5,852,558 A | 12/1998 | Julian et al. |
| 6,242,884 B1 * | 6/2001 | Lipo et al. ............ 318/808 |
| 6,465,973 B1 * | 10/2002 | Kato et al. ............ 318/400.32 |
| 6,617,820 B2 * | 9/2003 | Carlson et al. ............ 318/727 |
| 6,956,341 B2 | 10/2005 | Nakai et al. |
| 7,057,361 B2 | 6/2006 | Kitahata et al. |
| 7,084,600 B2 | 8/2006 | Suzuki et al. |
| 7,154,237 B2 | 12/2006 | Welchko et al. |
| 7,215,116 B2 * | 5/2007 | Nishimura ............ 324/207.25 |
| 7,224,079 B2 | 5/2007 | Kanazawa et al. |
| 7,307,401 B2 | 12/2007 | Gataric et al. |
| 7,391,181 B2 | 6/2008 | Welchko et al. |
| 7,411,801 B2 | 8/2008 | Welchko et al. |
| 7,471,004 B2 | 12/2008 | Kanazawa et al. |
| 7,619,344 B2 * | 11/2009 | Osawa et al. ............ 310/198 |

(Continued)

FOREIGN PATENT DOCUMENTS

CN    1829073 A    9/2006

OTHER PUBLICATIONS

U.S. Office Action for U.S. Appl. No. 12/236,172 mailed Apr. 19, 2011.

(Continued)

*Primary Examiner* — Paul Ip

(57) ABSTRACT

An automotive drive system and methods for making the same are provided. The system includes a three-phase motor and an inverter module. The three-phase motor includes a first set of windings each having a first magnetic polarity; and a second set of windings each having a second magnetic polarity that is opposite the first magnetic polarity. The first set of windings being electrically isolated from the second set of windings. The inverter module includes a first set of phase legs and a second set of phase legs. Each one of the first set of phase legs is coupled to a corresponding phase of the first set of windings, and each one of the second set of phase legs is coupled to a corresponding phase of the second set of windings.

20 Claims, 5 Drawing Sheets

U.S. PATENT DOCUMENTS

| | | |
|---|---|---|
| 7,808,125 B1 | 10/2010 | Sachdeva et al. |
| 7,830,060 B2 * | 11/2010 | Miyata et al. .................. 310/180 |
| 7,915,778 B2 * | 3/2011 | Miyata et al. .................. 310/180 |
| 7,952,316 B2 * | 5/2011 | Ganev et al. .................. 318/773 |
| 2002/0108387 A1 * | 8/2002 | Barrett et al. ................. 62/323.3 |
| 2003/0048089 A1 * | 3/2003 | Carlson et al. ................. 318/727 |
| 2005/0174076 A1 | 8/2005 | Katanaya |
| 2006/0119352 A1 * | 6/2006 | Nishimura ............... 324/207.25 |
| 2006/0220489 A1 * | 10/2006 | Osawa et al. .................. 310/198 |
| 2008/0094023 A1 | 4/2008 | West et al. |
| 2008/0116840 A1 | 5/2008 | Welchko et al. |
| 2008/0197902 A1 | 8/2008 | Welchko et al. |
| 2008/0258673 A1 | 10/2008 | Welchko et al. |
| 2008/0297100 A1 | 12/2008 | Hiti et al. |
| 2009/0069142 A1 | 3/2009 | Welchko et al. |
| 2009/0107742 A1 | 4/2009 | Schulz et al. |
| 2009/0108780 A1 | 4/2009 | Schulz et al. |
| 2009/0108798 A1 | 4/2009 | Schulz et al. |
| 2009/0230806 A1 * | 9/2009 | Miyata et al. .................. 310/195 |

OTHER PUBLICATIONS

Notice of Allowance mailed Jul. 1, 2011, for U.S. Appl. No. 12/236,172.

Office Action mailed Nov. 26, 2010, issued in U.S. Appl. No. 12/236,172.

Welchko, B.A., et al., "Method and system for controlling a power inverter in electric drives," U.S. Appl. No. 12/013,093, filed Jan. 11, 2008.

\* cited by examiner

ELECTRICAL SYSTEM USING PHASE-SHIFTED CARRIER SIGNALS AND RELATED OPERATING METHODS

CROSS-REFERENCE TO RELATED APPLICATION

This is a continuation-in-part of application Ser. No. 12/236,172, filed Sep. 23, 2008.

STATEMENT REGARDING FEDERALLY SPONSORED RESEARCH OR DEVELOPMENT

The United States government has a paid-up license in this invention and the right in limited circumstances to require the patent owner to license others on reasonable terms as provided by the terms of contract number DE-FC26-07NT43123 awarded by the United States Department of Energy.

TECHNICAL FIELD

Embodiments of the subject matter described herein relate generally to vehicle drive systems, and more particularly, embodiments of the subject matter relate to electric and/or hybrid vehicles having an inverter drive system.

BACKGROUND

In recent years, advances in technology, as well as ever evolving tastes in style, have led to substantial changes in the design of automobiles. One of the changes involves the power usage and complexity of the various electrical systems within automobiles, particularly alternative fuel vehicles, such as hybrid, electric, and fuel cell vehicles.

Many of the electrical components, including the electric motors used in such vehicles, receive electrical power from alternating current (AC) power supplies. However, the power sources (e.g., batteries) used in such applications provide only direct current (DC) power. Thus, devices known as "power inverters" are used to convert the DC power to AC power, which often utilize several of switches, or transistors, operated at various intervals to convert the DC power to AC power.

Often, a capacitor is configured electrically in parallel between a DC energy source and the power inverter in order to reduce voltage ripple. In a standard three-phase inverter, the filter capacitor current is a function of the modulation index and output current. This capacitor, often referred to as the DC link capacitor or bulk capacitor, must have a large enough capacitance and power rating to handle a peak RMS ripple current during operation. Often, the capacitor current limits the ability to shrink the size and cost of the capacitor in the inverter. This generally results in use of a larger capacitor than necessary because it is difficult to find a capacitor with the proper capacitance and current rating. Typically, the capacitor ranges from approximately 500 microfarads with a volume of approximately 0.9 liters to 1000 microfarads with a volume of approximately 4.0 liters. As a result, when packaged together with an inverter, the capacitor typically occupies 30 to 40 percent of the total volume of the power inverter module. This, in turn, limits the ability to reduce the size, weight, and cost of the power inverter module.

BRIEF SUMMARY

An automotive drive system and methods for making the same are provided. The system includes a three-phase motor and an inverter module. The three-phase motor includes a first set of windings each having a first magnetic polarity; and a second set of windings each having a second magnetic polarity that is opposite the first magnetic polarity. The first set of windings being electrically isolated from the second set of windings. The inverter module includes a first set of phase legs and a second set of phase legs. Each one of the first set of phase legs is coupled to a corresponding phase of the first set of windings, and each one of the second set of phase legs is coupled to a corresponding phase of the second set of windings.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the schematics shown herein depict exemplary arrangements of elements, additional intervening elements, devices, features, or components may be present in an embodiment of the depicted subject matter. Furthermore, the terms "first", "second" and other such numerical terms referring to structures do not imply a sequence or order unless clearly indicated by the context.

For the sake of brevity, conventional techniques related to signaling, current sensing, motor control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Technologies and concepts discussed herein relate to systems and methods for operating an electric motor using a power inverter module. In an exemplary embodiment, the electric motor is realized as a three-phase motor having two sets of windings, wherein each set of windings is a three-phase set of windings. The first set of windings is controlled by a first set of phase legs in the inverter module, and the second set of windings is controlled by a second set of phase legs in the inverter module. The first set of phase legs is controlled by generating pulse-width modulation (PWM) signals with respect to a first carrier signal and the second set of phase legs is controlled by generating PWM signals with respect to a second carrier signal. The resulting DC link capacitor ripple current is reduced, thereby allowing for the use of a smaller DC link capacitor when coupling the inverter module to an energy source.

Figure 1:
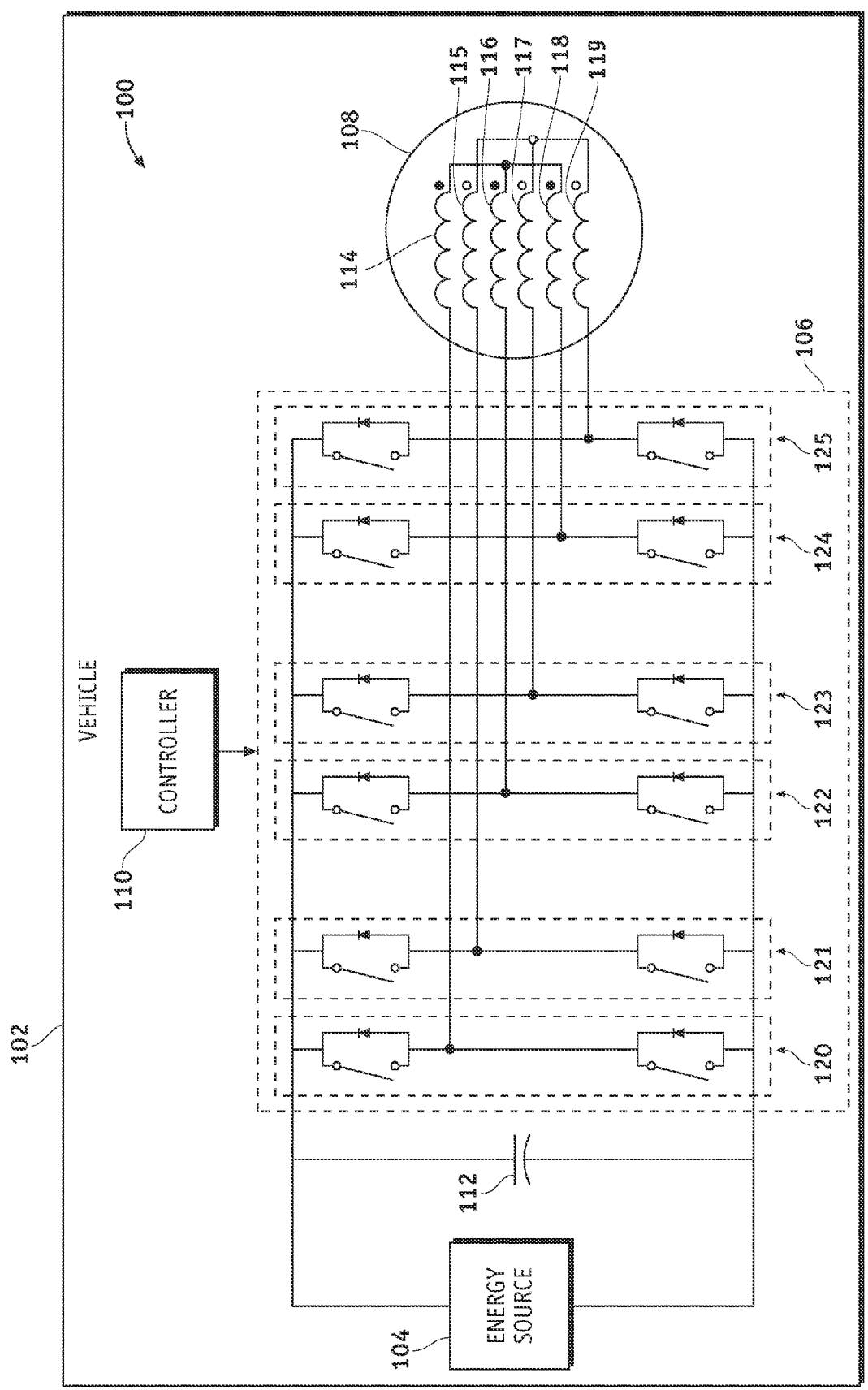
FIG. 1 is a block diagram of an exemplary electrical system suitable for use in a vehicle in accordance with one embodiment.

FIG. 1 depicts an exemplary embodiment of an electrical system 100 suitable for use as an automotive drive system for a vehicle 102. In an exemplary embodiment, the electrical system 100 includes, without limitation, an energy source 104, a power inverter module 106, a motor 108, and a controller 110. A capacitor 112 may be coupled between the energy source 104 and the inverter module 106 such that the capacitor 112 and energy source 104 are electrically parallel. In this regard, the capacitor 112 may alternatively be referred to as the DC link capacitor or bulk capacitor. In an exemplary embodiment, the controller 110 operates the inverter module 106 to achieve a desired power flow between the energy source 104 and the motor 108 and reduce ripple current, as described below.

The vehicle 102 is preferably realized as an automobile, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The vehicle 102 may also incorporate any one of, or combination of, a number of different types of engines, such as, for example, a gasoline or diesel fueled combustion engine, a "flex fuel vehicle" (FFV) engine (i.e., using a mixture of gasoline and alcohol), a gaseous compound (e.g., hydrogen and natural gas) fueled engine, a combustion/electric motor hybrid engine, and an electric motor. In this regard, the energy source 104 may comprise a battery, a fuel cell (or fuel cell stack), an ultracapacitor, a controlled generator output, or another suitable voltage source. The battery may be any type of battery suitable for use in a desired application, such as a lead acid battery, a lithium-ion battery, a nickel-metal battery, or another rechargeable battery.

In an exemplary embodiment, the motor 108 is a multi-phase alternating current (AC) motor and includes a set of windings (or coils), wherein each winding corresponds to a phase of the motor 108, as described in greater detail below. Although not illustrated, the motor 108 includes a stator assembly (including the coils), a rotor assembly (including a ferromagnetic core), and a cooling fluid (i.e., coolant), as will be appreciated by one skilled in the art. The motor 108 may be an induction motor, a permanent magnet motor, or any type suitable for the desired application. Although not illustrated, the motor 108 may also include a transmission integrated therein such that the motor 108 and the transmission are mechanically coupled to at least some of the wheels of the vehicle 102 through one or more drive shafts.

In the exemplary embodiment shown in FIG. 1, the motor 108 is realized as a three-phase AC motor having a first three-phase set of windings (including windings 114, 116, and 118) and a second three-phase set of windings (including winding 115, 117, and 119). In this regard, the motor 108 may be understood as having a dual three-phase winding configuration. It should be understood that although the electrical system 100 is described herein in the context of a three-phase motor, the subject matter described herein is independent of the number of phases of the motor.

In an exemplary embodiment, the first three-phase set of windings and the second three-phase set of windings are electrically isolated from each other and have the same or identical winding structure. That is, a first (e.g., phase A) winding 114 of the first set of windings has the same winding factor as a second (e.g., phase A) winding 115 of the second set of windings. Additionally, the two phase A windings 114, 115 are electrically isolated and occupy (or share) the same slots in the stator of the motor 108. In a similar manner, the two phase B windings 116, 117 have the same winding factor and occupy the same slots in the stator, and the two phase C windings 118, 119 have the same winding factor and occupy the same slots in the stator. It should be understood that the labeling of phases A, B, and C is for ease of description and is not intended to limit the subject matter in any way.

In an exemplary embodiment, the two sets of windings are each configured as a wye-connection. For example, one end of each winding of the first set of windings is connected to ends of the other windings of the first set at a common node. That is, the same ends of winding 114, winding 116, and winding 118 are connected and/or terminate at a common node. In an exemplary embodiment, where the first set of windings and the second set of windings have the same winding structure, the ends of winding 115, winding 117, and winding 119 are connected and/or terminate at a second common node at the same end as the first set of windings.

In the exemplary embodiment shown in FIG. 1, the power inverter module 106 includes twelve switches (e.g., semiconductor devices, such as transistors and/or switches) with antiparallel diodes (i.e., diodes which are antiparallel to each switch). Preferably, the switches are realized using insulated-gate bipolar transistors (IGBTs). As shown, the switches in the inverter module 106 are arranged into six legs (or pairs), with legs 120, 122, 124 each being coupled to a respective end (i.e., the end of the windings not connected to form the wye-connection) of the windings 114, 116, 118, and legs 121, 123, 125 each being coupled to a respective end of the windings 115, 117, 119. In this regard, leg 120 is coupled to the first phase A winding 114, leg 122 is coupled to the first phase B winding 116, and leg 124 is coupled to the first phase C winding 118. Similarly, leg 121 is coupled to the second phase A winding 115, leg 123 is coupled to the second phase B winding 117, and leg 125 is coupled to the second phase C winding 119. Thus, legs 120 and 121 may be collectively referred to as the phase A legs, legs 122 and 123 the phase B legs, and legs 124, 125 the phase C legs.

In an exemplary embodiment, the controller 110 is in operable communication and/or electrically coupled to the inverter module 106. The controller 110 is responsive to commands received from the driver of the vehicle 102 (e.g., via an accelerator pedal) and provides a command to the inverter module 106 to control the output of the inverter phase legs 120, 121, 122, 123, 124, 125. In an exemplary embodiment, the controller 110 is configured to modulate and control the inverter module 106 using high frequency pulse width modulation (PWM), as described below. The controller 110 provides PWM signals to operate the switches within the inverter phase legs 120, 121, 122, 123, 124, 125 to cause output voltages to be applied across the windings 114, 115, 116, 117, 118, 119 within the motor 108 in order to operate the motor 108 with a commanded torque. Although not illustrated, the controller 110 may generate current and/or voltage commands for the phases of the motor 108 in response to receiving a torque command from an electronic control unit (ECU) or another control module within the vehicle 102. Further, in some embodiments, the controller 110 may be integral with an ECU or another vehicle control module.

In an exemplary embodiment, the controller 110 determines a current and/or voltage command, hereinafter referred to as the "command signal," for the individual phases of the motor 108 based on based on the torque command, the voltage of energy source 104, the angular velocity of the motor 108, and possibly other operating parameters of the electric system 100. The controller 110 then generates PWM signals for the switches in the inverter module 106 by comparing the command signal to a carrier signal in a known manner. For example, the controller 110 may generate PWM signals for the inverter phase legs 120, 121, 122, 123, 124, 125 by using an intersective method. In this manner, the command signal is compared to the carrier signal (e.g., a triangle waveform or sawtooth waveform), and a PWM signal is generated by setting the high (or on state) for the switches when the value of the command signal is greater than the carrier signal. Various methods of generating PWM signals are well known will not be described in detail herein.

In an exemplary embodiment, the controller 110 is configured to modulate the first set of phase legs 120, 122, 124 by generating PWM signals for the switches of phase legs 120, 122, 124 using a first carrier signal and modulate the second set of phase legs 121, 123, 125 by generating PWM signals for the switches of phase legs 121, 123, 125 using a second carrier signal. In accordance with one embodiment, the controller 110 is configured to determine or identify a modulation mode for the inverter module 106. For example, depending on the real-time operation of the electrical system 100, it may be desirable to utilize different PWM techniques, such as continuous PWM or discontinuous PWM, to reduce losses or undesirable harmonics in the electrical system 100. In an exemplary embodiment, the controller 110 determines the second carrier signal by adding a phase shift to the first carrier signal based on the identified modulation mode. In this regard, the first carrier signal and the second carrier signal may be understood as being interleaved.

Figure 3:
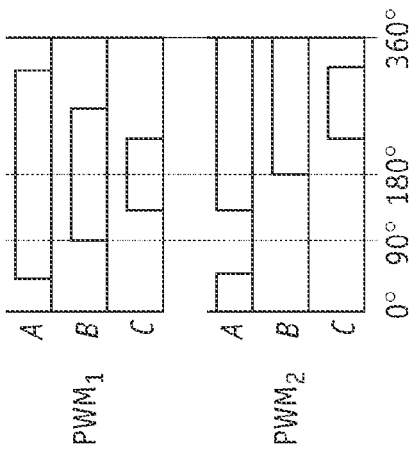
FIG. 3 is a graph of exemplary pulse-width modulation signals with respect to a switching cycle showing the effect of the phase-shifted carriers of FIG. 2 in accordance with one embodiment.
Figure 2:
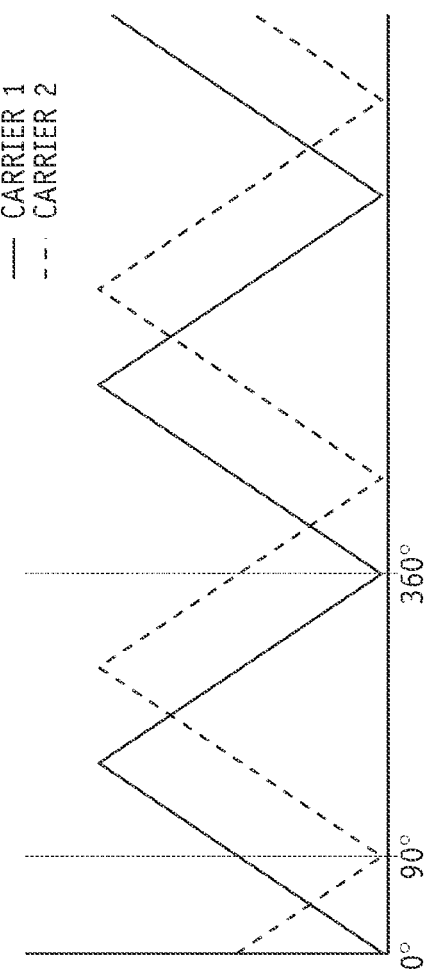
FIG. 2 is a graph of phase-shifted carrier signals suitable for use with the electrical system of FIG. 1 in accordance with one embodiment.

Referring now to FIG. 2 and FIG. 3, in an exemplary embodiment, if the modulation mode is identified as a continuous modulation mode, the controller 110 determines the second carrier signal (CARRIER 2) by adding a 90° (or $\pi/2$ radians) phase shift to the first carrier signal (CARRIER 1). As used herein, continuous modulation mode should be understood as a mode wherein each phase leg of a set of phase legs changes state for at least some portion of each switching period. It should be understood that although FIG. 2 illustrates the carrier signals as being triangle waveforms, the subject matter described herein is not limited to any particular carrier waveform. In an exemplary embodiment, the controller 110 generates a first PWM signal ($PWM_1$) for the first set of phase legs 120, 122, 124 using the first carrier signal (CARRIER 1) and a second PWM signal ($PWM_2$) for the second set of phase legs 121, 123, 125 using the second carrier signal (CARRIER 2) as shown in FIG. 3.

Referring to FIG. 3, it should be understood that a high state is intended to indicate the situation where the top switch in a respective inverter phase leg is on and a low state is intended to indicate the situation where the bottom switch in the respective inverter phase leg is on. As shown by the PWM signal for the first set of phase legs ($PWM_1$), the phase legs 120, 122, 124 are all in the same state at 0°, 180°, and 360°. This is consistent with conventional continuous PWM modulation where all inverter phase legs in a set are in the same state at the beginning (0°), middle (180°), and end (360°) of the switching period. If the PWM signal for the second set of phase legs, $PWM_2$, were generated using the same carrier as the first set of phase legs (e.g., CARRIER 1), the capacitor 112 would be effectively isolated or disconnected from the motor 108 at 0°, 180°, and 360° in the switching period. The motor currents all flow through the phase legs in the inverter 106, and therefore would produce a ripple current or inrush current when the motor currents are allowed to flow through the capacitor 112 after these points in the switching cycle. Thus, because continuous PWM modulation is symmetric to 180° (or $\pi$ radians) or one half of the carrier cycle, a 90° phase shift is chosen to maximize the cancellation of ripple current caused by the motor 108 and thereby reduce the ripple current which must flow through the capacitor 112.

Figure 5:
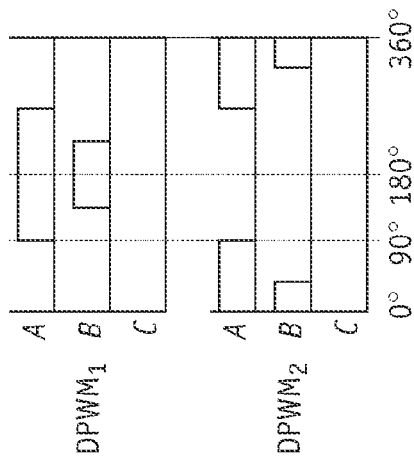
FIG. 5 is a graph of exemplary pulse-width modulation signals with respect to a switching cycle showing the effect of the phase-shifted carriers of FIG. 4 in accordance with one embodiment.
Figure 4:
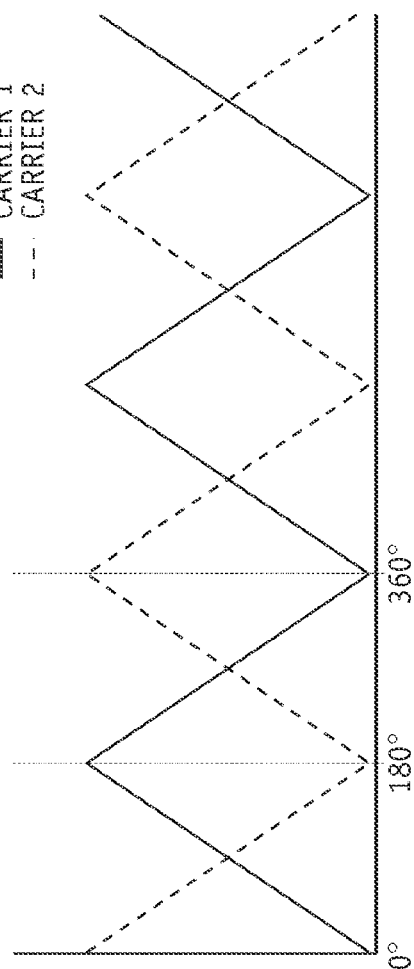
FIG. 4 is a graph of phase-shifted carrier signals suitable for use with the electrical system of FIG. 1 in accordance with one embodiment.

Referring now to FIG. 4 and FIG. 5, in an exemplary embodiment, if the modulation mode is identified as a discontinuous modulation mode, the controller 110 determines the second carrier signal by adding a 180° (or $\pi$ radians) phase shift to the first carrier signal. As used herein, discontinuous modulation mode should be understood as a mode where at least one phase leg of a set of phase legs does not change state during each switching period. In an exemplary embodiment, the controller 110 generates a first DPWM signal ($DPWM_1$) for the first set of phase legs 120, 122, 124 using the first carrier signal (CARRIER 1) and a second DPWM signal ($DPWM_2$) for the second set of phase legs 121, 123, 125, using the second carrier signal (CARRIER 2) as shown in FIG. 5.

Referring to FIG. 5, it should be understood that a high state is intended to indicate the situation where the top switch in a respective inverter phase leg is on and a low state is intended to indicate the situation where the bottom switch in the respective inverter phase leg is on. As shown by the PWM signal for the first set of phase legs ($DPWM_1$), the first set phase legs 120, 122, 124 are all in the same state at 0° and 360°. This is consistent with conventional discontinuous PWM modulation where all inverter phase legs in a set are in the same state at the beginning (0°) and end (360°) of the switching period. If the PWM signal for the second set of phase legs, DPWM$_2$, were generated using the same carrier as the first set of phase legs (e.g., CARRIER 1), the capacitor 112 would be effectively isolated or disconnected from the motor 108 at 0° and 360° in the switching period. The motor currents all flow through the phase legs in the inverter 106, and would produce a ripple current or inrush current when the motor currents are allowed to flow through the capacitor 112. Thus, because discontinuous PWM modulation is symmetric to 360° (or 2π radians) or the full carrier cycle, a 180° phase shift is chosen to maximize the cancellation of ripple current caused by the motor 108 and thereby reduce the ripple current which must flow through the capacitor 112.

Still referring to FIGS. 2-5, as a result of the phase-shifted carrier signals, each phase leg 120, 121, 122, 123, 124, 125 of the inverter module 106 carries one-half of the required current for the respective phase of the motor 108. For example, the first phase A leg 120 carries one half of the commanded phase A current which flows through the first phase A winding 114 and the second phase A leg 121 carries one half of the commanded phase A current which flows through the second phase A winding 115. The effective current seen by the phase A of the motor 108 is the sum of the currents through the phase A windings 114, 115, which equals the commanded phase A current.

Figure 6:
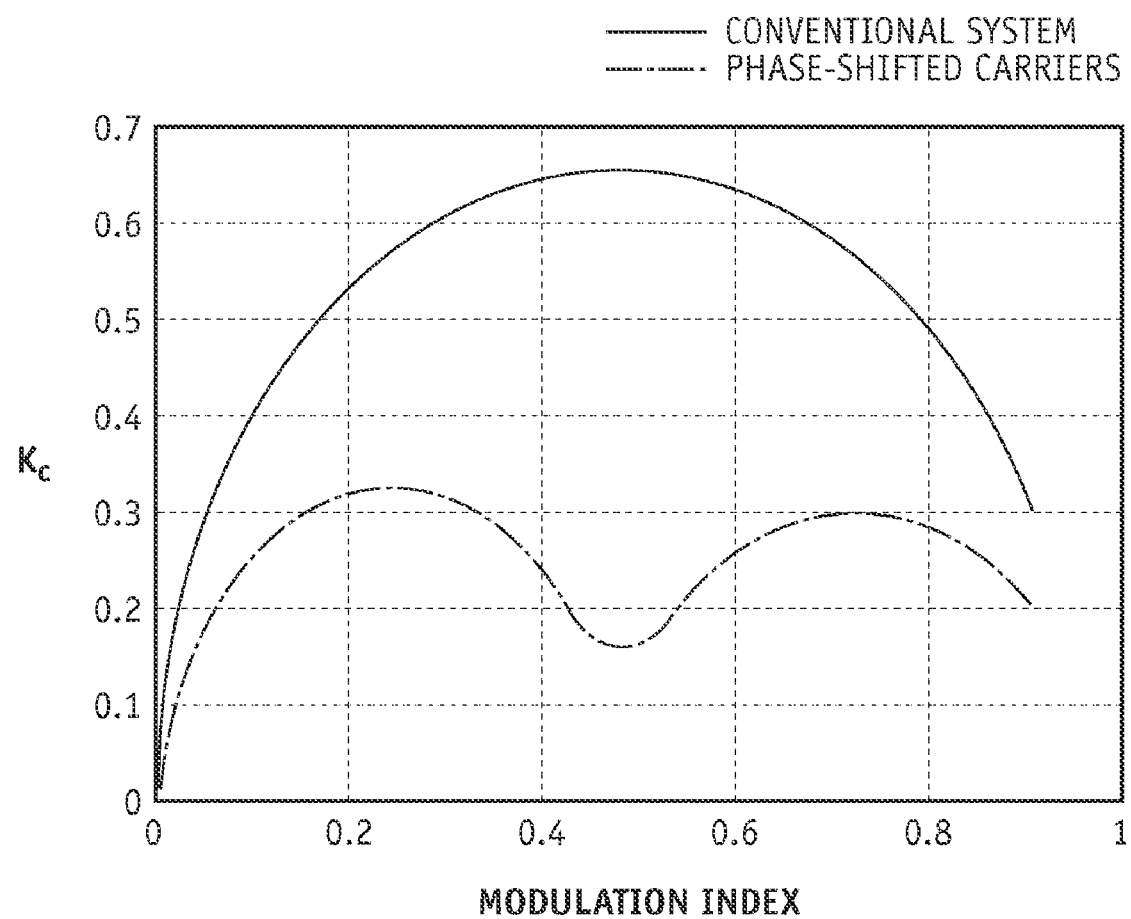
FIG. 6 is a graph of the ratio of capacitor current to output current versus modulation index for a conventional system compared to an exemplary electrical system using phase-shifted carrier signals in accordance with one embodiment.

Referring now to FIG. 6, by using phase-shifted carriers in this manner, the peak RMS ripple current seen by the capacitor 112 may be reduced by a factor of two relative to a conventional three-phase inverter system. For example, as shown in FIG. 6 for an exemplary case, the worst case or peak value of $K_C$, the ratio of capacitor current to the total output current to the motor 108, is reduced by a factor of two for the system using phase-shifted carriers when compared to a conventional system. As a result, the maximum power dissipated by the capacitor 112 is reduced by a factor of four. The frequency of the ripple current is also doubled relative to the conventional three-phase inverter system. Thus, the capacitance of the capacitor 112 may be reduced, and the volume of the capacitor 112 reduced up to a factor of four relative to conventional systems. The use of phase-shifted carriers also doubles the inverter switching frequency harmonics seen by the motor flux, which results in a more sinusoidal motor flux.

To briefly summarize, the systems and/or methods described above provide a way to reduce the peak RMS ripple current seen by the DC link capacitor and thereby reduce the volume and weight of the power inverter module. Phase-shifted carriers are used to generate PWM signals for separate three-phase groups within the motor to maximize ripple current cancellation by the inverter module. As described above, the performance of the motor is not impaired and the commanded torque may still be generated within the motor.

Other embodiments may utilize system and method described above in different types of automobiles, different vehicles (e.g., watercraft and aircraft), or in different electrical systems altogether, as it may be implemented in any situation where it is desirable to reduce the ripple current caused by a power module. Further, the motor and the inverters may have different numbers of phases, and the systems described herein should not be construed as limited to a three-phase design. The basic principles discussed herein may be extended to higher-order phase systems as will be understood in the art.

Figure 7A:
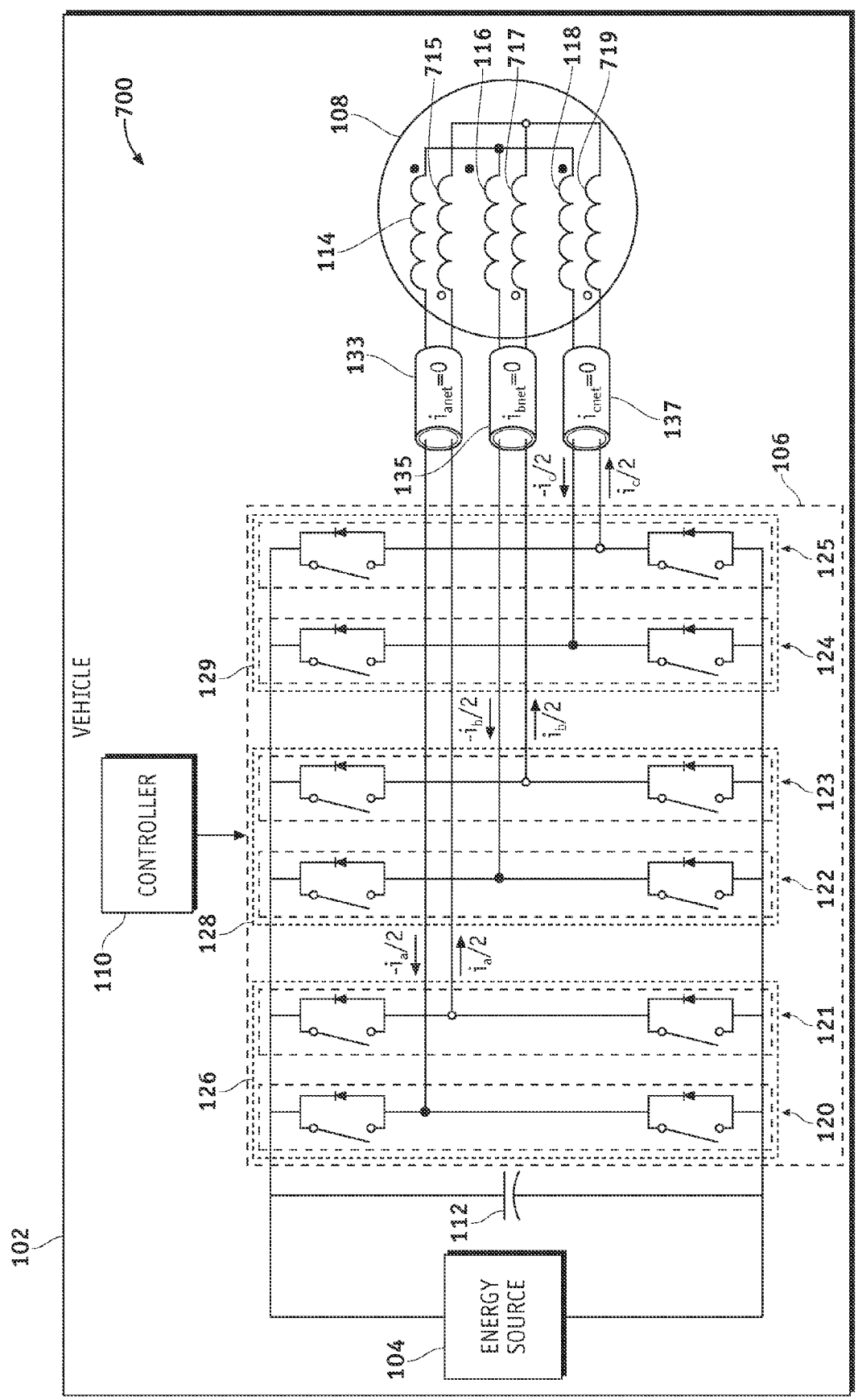
FIG. 7A is a block diagram of an exemplary electrical system suitable for use in a vehicle in accordance with another embodiment.
Figure 7B:
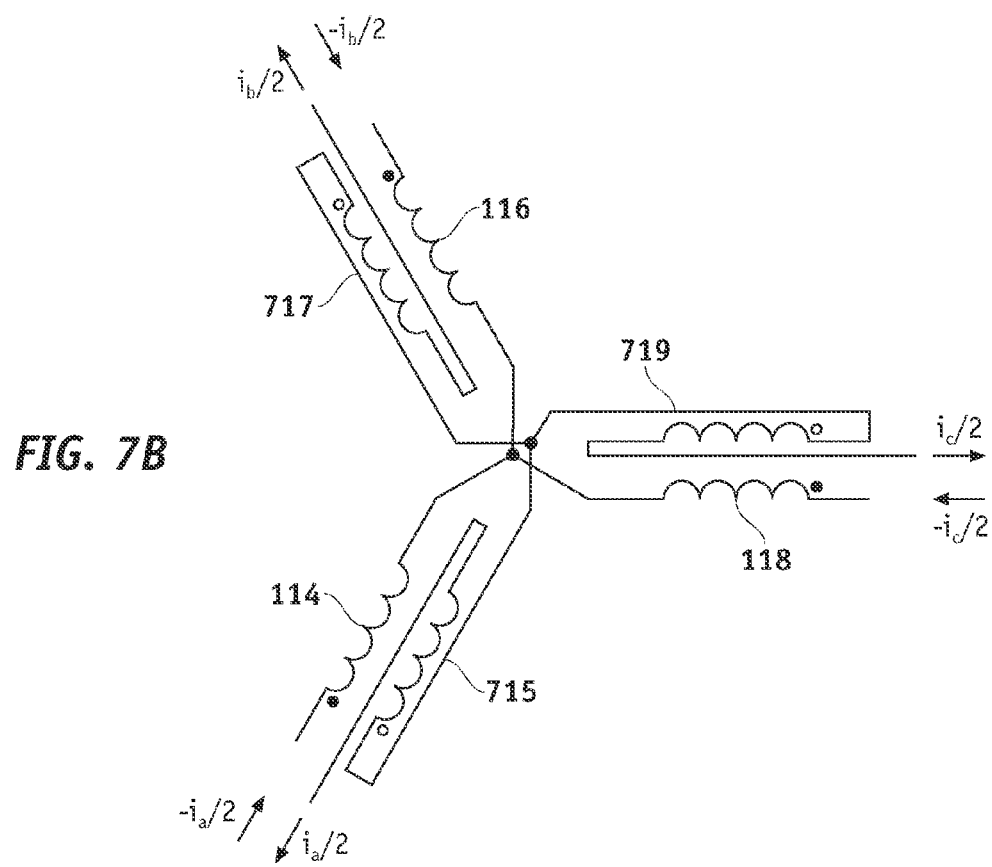
FIG. 7B is a schematic diagram of an exemplary motor winding structure of a motor in accordance with one implementation of the motor that is illustrated in FIG. 7A.

FIG. 7A is a block diagram of an exemplary electrical system suitable for use in a vehicle in accordance with another embodiment. FIG. 7B is a schematic diagram of an exemplary motor winding structure of a motor 108 in accordance with one implementation of the motor 108 that is illustrated in FIG. 7A. The embodiment illustrated in FIG. 7A employs a "dual leg topology" that operates with interleaved PWM controls and that is similar to the embodiment illustrated in FIG. 1. As such, the embodiment illustrated in FIG. 7A includes some of the same elements as the embodiment illustrated in FIG. 1, and where elements are the same the numbering from FIG. 1 has been retained, and for sake of brevity those elements will not be fully describe again. As will now be described, the embodiment illustrated in FIG. 7A differs from the embodiment illustrated in FIG. 1 in that the phases are in anti-parallel. In other words, the two sets of inverter phase legs are arranged in an anti-polarity condition or have "anti-polarity phase connections" along with a magnetic polarity reversal of one set of windings 715, 717, 719 in the motor 108 as indicated by the dots on the windings being arranged at different ends of the windings set of windings 715, 717, 719. Here the term "anti-polarity" refers to the fact that the system 700 is divided into two three-phase groups that are connected in opposite polarity.

The system 700 includes a DC energy source 104, a three-phase motor 108, and an inverter module 106 coupled between the DC energy source 194 and the motor 108.

The three-phase motor 108 is driven by a first phase current ($i_a$), a second phase current ($i_b$) and a third phase current ($i_c$). The three-phase motor 108 includes a first set of normal polarity windings 114, 116, 118 each having a first magnetic polarity, and a second set of reversed polarity windings 715, 717, 719 each having a second magnetic polarity that is opposite the first magnetic polarity. The first set of normal polarity windings 114, 116, 118 are electrically isolated from the second set of reversed polarity windings 715, 717, 719. For instance, the first set of normal polarity windings 114, 116, 118 comprises first normal polarity winding 114, a second normal polarity winding 116, and a third normal polarity winding 118, whereas the second set of reversed polarity windings 715, 717, 719 comprises a first reversed polarity winding 715, a second reversed polarity winding 717, and a third reversed polarity winding 719. In one implementation that is illustrated in FIG. 7B, the polarity of the second set of windings 715, 717, 719 is reversed with respect to the polarity of the windings 114, 116, 118 by swapping end connections of the windings, where there are two insulated windings in the same slots with an equally split number of turns. By inverting the polarity of one group of motor windings 715, 717, 719 and reversing the direction of current flow, this embodiment allows for a net zero current flow in each of the three coupled motor phases.

As described above, with the dual winding structure of the disclosed embodiments the motor flux receives double (2X) the inverter switching frequency and hence a more sinusoidal current without increased inverter losses. The effective switching frequency is double because in a conventional single winding structure the motor 108 receives two (2) voltage pulses per PWM cycle, whereas with the dual winding structure of the disclosed embodiments there are two (2) voltage pulses per PWM cycle that occur at different times so the motor 108 receives four (4) voltage pulses per PWM cycle. Switching losses in the inverter are equal to the product of the number of transitions times current, and therefore even though the number of transitions doubles losses are the same because the current is halved.

The inverter module 106 includes a first inverter sub-module 126, a second inverter sub-module 128, and a third inverter sub-module 129. Each of the first, second and third inverter sub-modules 126, 128, 129 includes one of the first set of phase legs 120, 122, 124 and one of the second set of phase legs 121, 123, 125. Each inverter sub-module 126, 128, 129 includes two phase legs, where a first phase leg belongs to a normal polarity "group" and where a second phase leg belongs to a reverse polarity "group" As used herein, the term "normal polarity" when used to describe a phase leg is used to note that a phase leg of an inverter sub-module is coupled to a normal polarity motor winding, and not to describe a polarity characteristic of the phase leg itself. Likewise, the term "reversed polarity" when used to describe a phase leg is used to note that a phase leg of an inverter sub-module is coupled to a reversed polarity motor winding, and not to describe a polarity characteristic of the phase leg itself. In this regard, the inverter structure of the phase legs that belong to a normal polarity "group" of phase legs that belong to the reverse polarity "group" are structurally identical, and therefore the "polarity" modifier used to distinguish between different phase legs is not to be construed as meaning that the phase legs themselves have different polarities, but merely to distinguish between different phase legs based on the polarity of the motor winding they are coupled to.

The inverter module 106 includes a first set of normal polarity phase legs 120, 122, 124 each being coupled to a corresponding one of the first set of windings 114, 116, 118, and a second set of reversed polarity phase legs 121, 123, 125 each being coupled to a corresponding one of the second set of reversed polarity windings 715, 717, 719. For example, the first inverter sub-module 126 comprises a first normal polarity phase leg 120 that is coupled to the first normal polarity winding 114 and a first reversed polarity phase leg 121 that is coupled to first reversed polarity winding 715.

In this particular embodiment, the first set of normal polarity windings 114, 116, 118 are a first "three-phase" set of normal polarity windings, and the first set of normal polarity phase legs 120, 122, 124 includes three normal polarity phase legs, each being connected to a respective phase of the first three-phase set of normal polarity windings. Similarly, the second set of reversed polarity windings 115, 117, 119 includes a second three-phase set of reversed polarity windings, and the second set of reversed polarity phase legs 121, 123, 125 includes three reversed polarity phase legs, each being connected to a respective phase of the second three-phase set of reversed polarity windings. However, it should be appreciated that the first and second sets can include any number of phases. Moreover, the first three-phase set of normal polarity windings 114, 116, 118 and the second three-phase set of reversed polarity windings 715, 717, 719 can have an identical winding structure.

Common mode current is a significant factor for radiated emissions for traction motor drive systems. Specifically, this common mode current is a function of shielding effectiveness, shield termination integrity, and loop area in terms of cable height above ground and distance between cables. Unfortunately, EMI filters are not effective on the AC motor cables because of the high motor currents saturate common mode inductors. It is desirable to reduce common mode current since this can reduce radiated emissions on the motor cables used to couple the inverter module 106 to the motor windings 114, 715, 116, 717, 118, 719 of motor 108 thereby improving EMI performance.

Figure 8A:
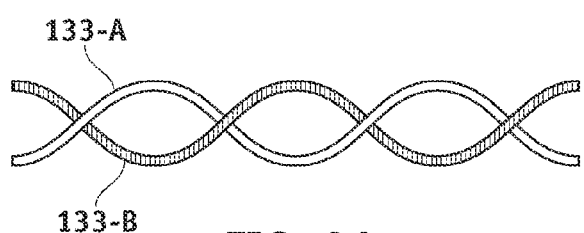
FIG. 8A is a diagram of conductors 133-A, 133-B an AC motor cable 133 that can be used in conjunction with the exemplary electrical system 700 of FIG. 7A in accordance with one embodiment.
Figure 8B:
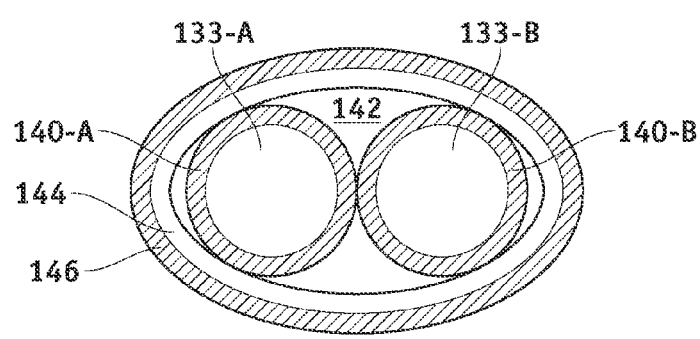
FIG. 8B is a cross-sectional view of an AC motor cable 133 that can be used in conjunction with the exemplary electrical system 700 of FIG. 7A in accordance with one embodiment.

FIG. 8A is a diagram of conductors 133-A, 133-B an AC motor cable 133 that can be used in conjunction with the exemplary electrical system 700 of FIG. 7A in accordance with one embodiment. FIG. 8B is a cross-sectional view of an AC motor cable 133 that can be used in conjunction with the exemplary electrical system 700 of FIG. 7A in accordance with one embodiment.

In accordance with one embodiment, AC motor cables 133, 135, 137 (of FIG. 7A) used to couple the phase legs to the windings are implemented using shielded twisted pair cabling or a "group shielded phase cable" that is twisted internally. Shielding and twisting the AC motor cables 133, 135, 137 reduces the inductive coupling and loop area of the motor cables, which in turn significantly reduces common mode current on the AC motor cables 133, 135, 137. As a result, EMI radiated emissions are reduced without the need for expensive EMI filters.

For instance, a first AC motor cable 133 includes a first conductor 133-A and a second conductor 133-B. The first conductor 133-A couples the first normal polarity phase leg 120 to the first normal polarity winding 114, and the second conductor 133-B that couples the first reversed polarity phase leg 121 to the first reversed polarity winding 715. The first conductor 133-A is encased in a first insulative sheath 140-A and the second conductor 133-B is encased in a second insulative sheath 140-B. The first conductor 133-A and the second conductor 133-B are twisted together and enclosed within a conductive shield 144 that surrounds the first conductor 133-A and the second conductor 133-B. The conductive shield 144 is encased in a third insulative sheath 146 that surrounds the conductive shield 144, the first conductor 133-A, and the second conductor 133-B.

The first conductor 133-A carries one-half of a first phase current signal $((-i_a)/2)$ to the first normal polarity winding 114, and the second conductor 133-B carries the other one-half of the first phase current signal $((+i_a)/2)$ to the first reversed polarity winding 715. The one-half of the first phase current signal $((-i_a)/2)$ is equal in magnitude and opposite in phase to the other one-half of the first phase current signal $((+i_a)/2)$ that is provided to the first reversed polarity winding 715 of the second set of reversed polarity windings 715, 717, 719. Similarly, the conductor 135-A carries one-half of a phase current signal $((-i_b)/2)$ to the second normal polarity winding 116, and the conductor 135-B carries the other one-half of the phase current signal $((+i_b)/2)$ to the second reversed polarity winding 717. The one-half of the phase current signal $((-i_b)/2)$ is equal in magnitude and opposite in phase to the other one-half of the phase current signal $((+i_b)/2)$ that is provided to the second reversed polarity winding 717 of the second set of reversed polarity windings 715, 717, 719. Likewise, the conductor 137-A carries one-half of a phase current signal $((-i_c)/2)$ to the third normal polarity winding 118, and the conductor 137-B carries the other one-half of the phase current signal $((+i_c)/2)$ to the third reversed polarity winding 719. The one-half of the phase current signal $((-i_c)/2)$ is equal in magnitude and opposite in phase to the other one-half of the phase current signal $((+i_c)/2)$ that is provided to the third reversed polarity winding 719 of the second set of reversed polarity windings 715, 717, 719.

The embodiment illustrated in FIG. 7A operates in the same manner as the embodiment illustrated in FIG. 1. The controller 110 controls the first set of normal polarity phase legs 120, 122, 124 of inverter module 106 and the second set of reversed polarity phase legs 121, 123, 125 of inverter module 106 as two distinct three-phase sets to achieve a desired power flow between the energy source 104 and the motor 108 by modulating the first set of normal polarity phase legs 120, 122, 124 using a first carrier signal, and by modulating the second set of reversed polarity phase legs 121, 123, 125 using a second carrier signal. As above, the second carrier signal being phase-shifted relative to the first carrier signal. In this regard, the controller 110 can identify a modulation mode for the inverter module 106, and determine the second carrier signal by adding a phase shift to the first carrier signal. The phase shift is based on the modulation mode. For instance, if the modulation mode is a continuous modulation mode, the controller 110 can determine the second carrier signal by adding a 90° phase shift to the first carrier signal. By contrast, if the modulation mode is a discontinuous modulation mode, the controller can determine the second carrier signal by adding a 180° phase shift to the first carrier signal.

The embodiments described in FIGS. 7-9 result in the same DC link capacitor 112 current reductions that are realized in the embodiments described above with reference to FIGS. 1-6, while also realizing improved EMI performance. As in the embodiment described with reference to FIGS. 1-6, the dual leg design reduces the capacitor current from a design perspective by a factor of two and doubles the frequency of the capacitor current. By interleaving the PWM controls of a dual leg inverter drive system, the associated dc link capacitor 112 current is halved while also doubling in frequency. As such a smaller DC link capacitor 112 can be used. In one implementation, this results in a typical capacitor volume reduction by a factor of four. This will reduce the capacitor losses by a factor of four and will allow for a significantly reduced volume of the bulk capacitor in the inverter. In addition, due to higher effective switching frequency resonance impact can be reduced.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A system having a DC energy source, comprising:
a three-phase motor having three motor phases that are driven by one of a first phase current signal ($i_a$), a second phase current signal ($i_b$) and a third phase current signal ($i_c$), the three-phase motor, the motor comprising:
a first set of normal polarity windings each having a first magnetic polarity; and
a second set of reversed polarity windings each having a second magnetic polarity that is opposite the first magnetic polarity, the first set of normal polarity windings being electrically isolated from the second set of reversed polarity windings;
an inverter module coupled between the DC energy source and the motor, the inverter module comprising:
a first set of normal polarity phase legs each being coupled to a corresponding one of the first set of windings; and
a second set of reversed polarity phase legs each being coupled to a corresponding one of the second set of reversed polarity windings, and
wherein inverting polarity of the second set of reversed polarity windings with respect to the first set of normal polarity windings and reversing direction of current signals flowing in the second set of reversed polarity windings with respect current signals flowing in the first set of normal polarity windings allows for an approximately zero net current flow in each of the three motor phases.

2. A system having a DC energy source, comprising:
a three-phase motor driven by a first phase current signal ($i_a$), a second phase current signal ($i_b$) and a third phase current signal ($i_c$), the three-phase motor, the motor comprising:
a first set of normal polarity windings each having a first magnetic polarity; and
a second set of reversed polarity windings each having a second magnetic polarity that is opposite the first magnetic polarity, the first set of normal polarity windings being electrically isolated from the second set of reversed polarity windings;
an inverter module coupled between the DC energy source and the motor, the inverter module comprising:
a first set of normal polarity phase legs each being coupled to a corresponding one of the first set of windings;
a second set of reversed polarity phase legs each being coupled to a corresponding one of the second set of reversed polarity windings;
a first inverter sub-module;
a second inverter sub-module; and
a third inverter sub-module, and wherein each of the first, second and third inverter sub-modules includes one of the first set of normal polarity phase legs and one of the second set of reversed polarity phase legs.

3. A system having a DC energy source, comprising:
a three-phase motor driven by a first phase current signal ($i_a$), a second phase current signal ($i_b$) and a third phase current signal ($i_c$), the three-phase motor, the motor comprising:
a first set of normal polarity windings each having a first magnetic polarity; and
a second set of reversed polarity windings each having a second magnetic polarity that is opposite the first magnetic polarity, the first set of normal polarity windings being electrically isolated from the second set of reversed polarity windings;
an inverter module coupled between the DC energy source and the motor, the inverter module comprising:
a first set of normal polarity phase legs each being coupled to a corresponding one of the first set of windings; and
a second set of reversed polarity phase legs each being coupled to a corresponding one of the second set of reversed polarity windings; and
a first inverter sub-module, comprising: a first normal polarity phase leg and a first reversed polarity phase leg, wherein the first set of normal polarity windings comprises first normal polarity winding, and wherein the second set of reversed polarity windings comprises a first reversed polarity winding, and wherein the system further comprises:
a first motor cable, comprising:
a first conductor that couples the first normal polarity phase leg to the first normal polarity winding, wherein the first conductor is designed to carry one-half of a first phase current signal (($-i_a$)/2)) to the first normal polarity winding; and
a second conductor that couples the first reversed polarity phase leg to the first reversed polarity winding, wherein the second conductor designed to carry the other one-half of the first phase current signal (($+i_a$)/2) to the first reversed polarity winding, and
wherein the one-half of the first phase current signal (($-i_a$)/2) is equal in magnitude and opposite in phase to the other one-half of the first phase current signal (($+i_a$)/2)

provided to the first reversed polarity winding of the second set of reversed polarity windings.

4. A system according to claim 3, wherein the first conductor and the second conductor are twisted together.

5. A system according to claim 4, wherein the first conductor and the second conductor are enclosed within a conductive shield that surrounds the first conductor and the second conductor.

6. A system according to claim 4, wherein the first conductor is encased in a first insulative sheath and the second conductor is encased in a second insulative sheath, and wherein the first conductor and the second conductor are enclosed within a conductive shield that surrounds the first conductor and the second conductor.

7. A system according to claim 6, wherein the conductive shield is encased in a third insulative sheath that surrounds the conductive shield, the first conductor, and the second conductor.

8. A system having a DC energy source, comprising:
a three-phase motor driven by a first phase current signal ($i_a$), a second phase current signal ($i_b$) and a third phase current signal ($i_c$), the three-phase motor, the motor comprising:
a first set of normal polarity windings each having a first magnetic polarity; and
a second set of reversed polarity windings each having a second magnetic polarity that is opposite the first magnetic polarity, the first set of normal polarity windings being electrically isolated from the second set of reversed polarity windings;
an inverter module coupled between the DC energy source and the motor, the inverter module comprising:
a first set of normal polarity phase legs each being coupled to a corresponding one of the first set of windings; and
a second set of reversed polarity phase legs each being coupled to a corresponding one of the second set of reversed polarity windings; and
a controller coupled to the inverter module, the controller being configured to control the first set of normal polarity phase legs of inverter module and the second set of reversed polarity phase legs of inverter module as two distinct three-phase sets to achieve a desired power flow between the energy source and the motor by:
modulating the first set of normal polarity phase legs using a first carrier signal; and
modulating the second set of reversed polarity phase legs using a second carrier signal, the second carrier signal being phase-shifted relative to the first carrier signal.

9. A system according to claim 8, wherein the controller is configured to:
identify a modulation mode for the inverter module; and
determine the second carrier signal by adding a phase shift to the first carrier signal, wherein the phase shift is based on the modulation mode.

10. A system according to claim 9, wherein if the modulation mode is a continuous modulation mode, the controller is configured to determine the second carrier signal by adding a 90° phase shift to the first carrier signal.

11. A system according to claim 10, wherein if the modulation mode is a discontinuous modulation mode, the controller is configured to determine the second carrier signal by adding a 180° phase shift to the first carrier signal.

12. A system according to claim 1, wherein:
the first set of normal polarity windings comprises a first three-phase set of normal polarity windings; and
the second set of reversed polarity windings comprises a second three-phase set of reversed polarity windings, wherein the first three-phase set of normal polarity windings and the second three-phase set of reversed polarity windings have an identical winding structure.

13. A system according to claim 1, wherein:
the first set of normal polarity phase legs comprises three normal polarity phase legs, each being connected to a respective phase of the first three-phase set of normal polarity windings; and
the second set of reversed polarity phase legs comprises three reversed polarity phase legs, each being connected to a respective phase of the second three-phase set of reversed polarity windings.

14. A system according to claim 1, further comprising:
a capacitor coupled to the inverter module and the energy source, wherein the capacitor is electrically parallel to the energy source.

15. An automotive drive system having an energy source, comprising:
a three-phase motor having three motor phases that are driven by one of a first phase current signal ($i_a$), a second phase current signal ($i_b$) and a third phase current signal ($i_c$), the three-phase motor, the motor comprising:
a first set of windings each having a first magnetic polarity;
a second set of windings each having a second magnetic polarity that is opposite the first magnetic polarity, the first set of windings being electrically isolated from the second set of windings;
an inverter module coupled between the energy source and the motor, the inverter module comprising:
a first set of phase legs each being coupled to a corresponding phase of the first set of windings,
a second set of phase legs each being coupled to a corresponding phase of the second set of windings; and
a capacitor coupled to the inverter module and the energy source, wherein the capacitor is electrically parallel to the energy source, and
wherein inverting polarity of the second set of reversed polarity windings with respect to the first set of normal polarity windings and reversing direction of current signals flowing in the second set of reversed polarity windings with respect current signals flowing in the first set of normal polarity windings allows for an approximately zero net current flow in each of the three motor phases.

16. An automotive drive system having an energy source, the automotive drive system, comprising:
a three-phase motor driven by a first phase current signal ($i_a$), a second phase current signal ($i_b$) and a third phase current signal ($i_c$), the three-phase motor, the motor comprising:
a first set of windings each having a first magnetic polarity;
a second set of windings each having a second magnetic polarity that is opposite the first magnetic polarity, the first set of windings being electrically isolated from the second set of windings;
an inverter module coupled between the energy source and the motor, the inverter module comprising:
a first set of phase legs each being coupled to a corresponding phase of the first set of windings,
a second set of phase legs each being coupled to a corresponding phase of the second set of windings;
a first inverter sub-module;
a second inverter sub-module; and
a third inverter sub-module, and wherein each of the first, second and third inverter submodules, includes one of the first set of phase legs and one of the second set of phase legs; and a capacitor coupled to the inverter module and the energy source, wherein the capacitor is electrically parallel to the energy source.

17. An automotive drive system An automotive drive system having an energy source, comprising:
- a three-phase motor driven by a first phase current signal ($i_a$), a second phase current signal ($i_b$) and a third phase current signal ($i_c$), the three-phase motor, the motor comprising:
  - a first set of windings each having a first magnetic polarity;
  - a second set of windings each having a second magnetic polarity that is opposite the first magnetic polarity, the first set of windings being electrically isolated from the second set of windings;
- an inverter module coupled between the energy source and the motor, the inverter module comprising:
  - a first set of phase legs each being coupled to a corresponding phase of the first set of windings,
  - a second set of phase legs each being coupled to a corresponding phase of the second set of windings; and
  - a first inverter sub-module comprising: a first normal polarity phase leg and a first reversed polarity phase leg, wherein the first set of windings comprises a first normal polarity winding, and wherein the second set of windings comprises a first reversed polarity winding, and
- a first motor cable, comprising:
- a first conductor that couples the first normal polarity phase leg to the first normal polarity winding, wherein the first conductor is designed to carry one-half of a first phase current signal (($-i_a$)/2)) to the first normal polarity winding; and
- a second conductor that couples the first reversed polarity phase leg to the first reversed polarity winding, wherein the second conductor designed to carry the other one-half of the first phase current signal (($+i_a$)/2) to the first reversed polarity winding, and
- wherein the one-half of the first phase current signal (($-i_a$)/2) is equal in magnitude and opposite in phase to the other one-half of the first phase current signal (($+i_a$)/2) provided to the first reversed polarity winding of the second set of windings; and a capacitor coupled to the inverter module and the energy source, wherein the capacitor is electrically parallel to the energy source.

18. An automotive drive system according to claim 17, wherein the first conductor is encased in a first insulative sheath and the second conductor is encased in a second insulative sheath, wherein the first conductor and the second conductor are twisted together, and wherein the first conductor and the second conductor are enclosed within a conductive shield that surrounds the first conductor and the second conductor, and wherein the conductive shield is encased in a third insulative sheath that surrounds the conductive shield, the first conductor, and the second conductor.

19. The automotive drive system of claim 15, wherein the energy source is selected from the group consisting of a battery, a fuel cell, an ultracapacitor, and a generator output.

20. A method of making an automotive drive system, comprising:
- providing a three-phase motor having three motor phases that are driven by one of a first phase current signal ($i_a$), a second phase current signal ($i_b$) and a third phase current signal ($i_c$), the three-phase motor comprising: a first set of windings each having a first magnetic polarity; and a second set of windings each having a second magnetic polarity that is opposite the first magnetic polarity, the first set of windings being electrically isolated from the second set of windings;
- providing an inverter module comprising a first set of phase legs and a second set of phase legs;
- coupling each one of the first set of phase legs to a corresponding phase of the first set of windings via a corresponding AC motor cable that includes a twisted pair of conductors; and
- coupling each one of the second set of phase legs to a corresponding phase of the second set of windings via a corresponding AC motor cable that includes a twisted pair of conductors, and
- wherein inverting polarity of the second set of windings with respect to the first set of windings and reversing direction of current signals flowing in the second set of windings with respect current signals flowing in the first set of windings allows for an approximately zero net current flow in each of the three motor phases.

* * * * *